March 28, 1961 V. F. DIAS 2,976,912
COMBINATION HIGH CHAIR, STROLLER AND TODDLER
Filed Feb. 3, 1958 2 Sheets-Sheet 1
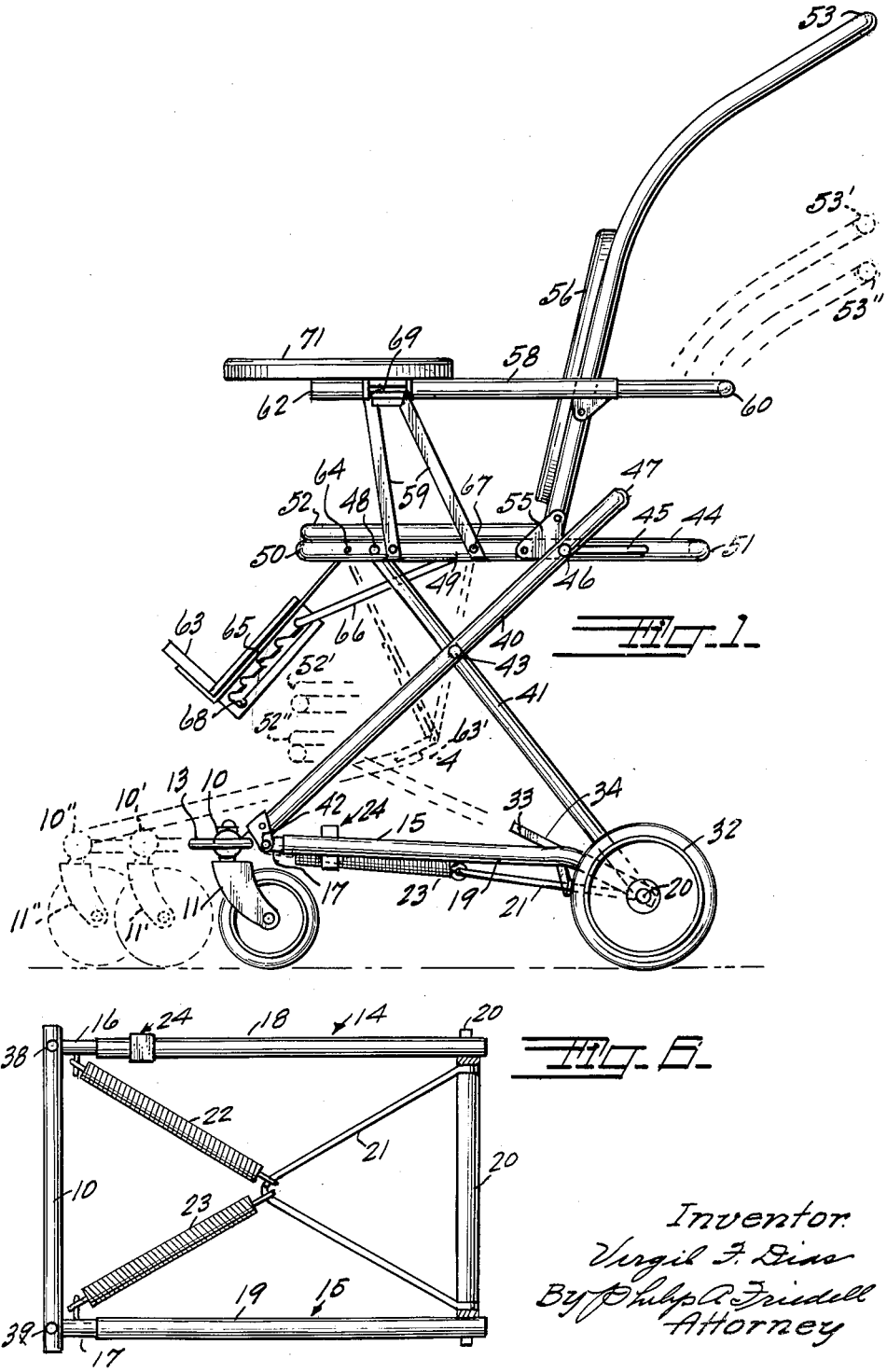
Inventor.
Virgil F. Dias
By Philip A. Friedell
Attorney March 28, 1961 V. F. DIAS 2,976,912
COMBINATION HIGH CHAIR, STROLLER AND TODDLER
Filed Feb. 3, 1958 2 Sheets-Sheet 2
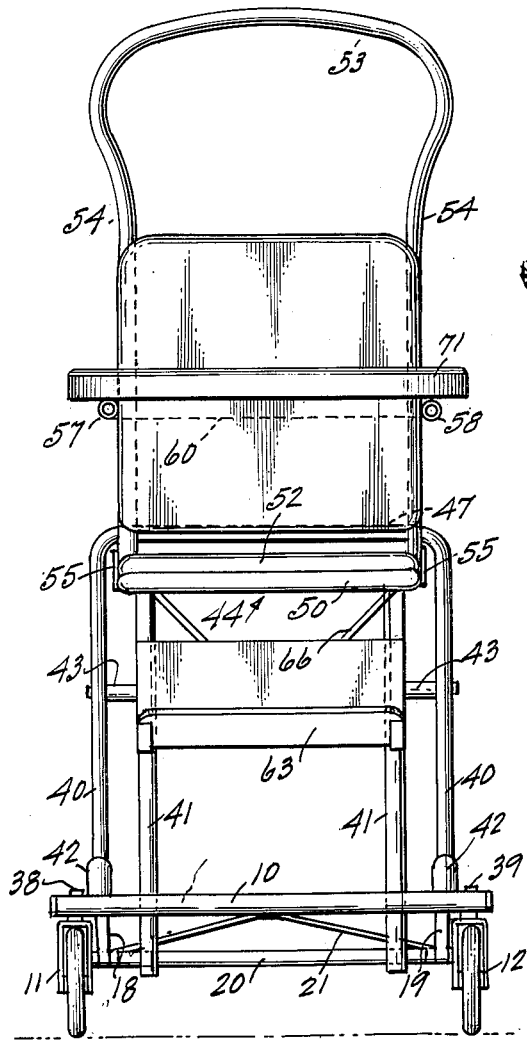
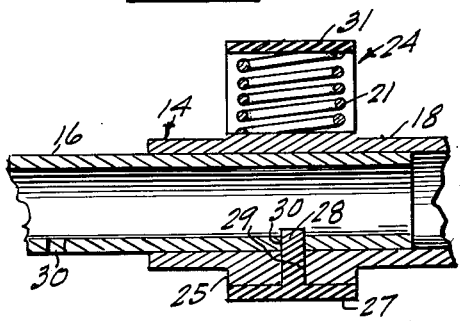
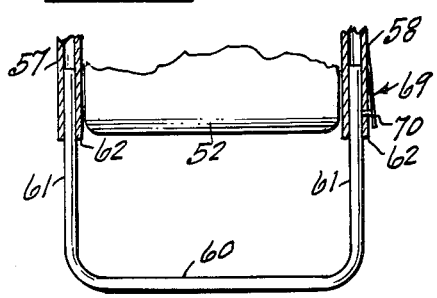
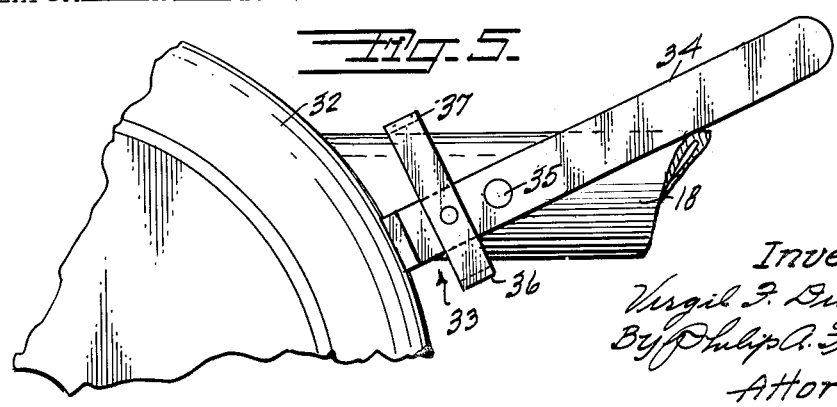
Inventor
Virgil F. Dias
By Philip A. Friedell
Attorney

United States Patent Office 2,976,912
Patented Mar. 28, 1961

2,976,912

COMBINATION HIGH CHAIR, STROLLER AND TODDLER

Virgil F. Dias, 823 Folger Ave., Berkeley, Calif.

Filed Feb. 3, 1958, Ser. No. 712,968

4 Claims. (Cl. 155—38)

This invention relates to improvements in vehicles for children, and provides a vehicle which is quickly and easily converted into a high chair, a stroller, or a toddler, at will, thus providing for use at the table at meal time, for conveying the child, or for providing a creeper or walker for the child.

It is well known that strollers and baby buggies have been provided for children, some of which are foldable or collapsible, but so far as known, none has ever been adjustable for other uses, and my invention not only provides for height adjustment, but also simultaneously extends the forward end of the chassis to provide clearance for the child's feet and legs for creeping or walking when the vehicle is adjusted to provide a toddler.

The objects and advantages of the invention are as follows:

First, to provide a four-wheeled vehicle for transporting a child.

Second, to provide a vehicle as outlined which is adjustable at will to a suitable height to form a high chair.

Third, to provide a vehicle as outlined which is adjustable to a sufficiently low level to form a toddler or walker for a child.

Fourth, to provide a vehicle as outlined with a chassis which simultaneously extends forwardly to provide clearance for the feet and legs of a child when the vehicle is converted into a toddler.

Fifth, to provide a vehicle as outlined with an adjustable foot rest and which can be retracted and secured in non-obstructional relation to the legs of a child when walking or creeping in the toddler.

In describing the invention reference will be had to the accompanying drawings, in which:

Fig. 1 is a side elevation of the invention, adjusted to form a high chair.

Fig. 2 is a front elevation of Fig. 1.

Fig. 3 is a fragmentary plan view shown partly in section of the rear end of the arm frame.

Fig. 4 is an enlarged fragmentary sectional view of one of the chassis side members with foot operated clutch.

Fig. 5 is an enlarged view of the foot operated brake.

Fig. 6 is a plan view of the chassis frame showing the tensioning springs for assisting in height adjustments.

The chassis consists of a front cross-member 10 adjacent the repective ends of which the casters 11 and 12 are pivoted on a vertical axis, and to which cross-member the bumper 13 is fixed. The side members 14 and 15 are telescopic, the male members 16 and 17 being fixed to the front cross-member 10 and are slidable in the female members 18 and 19, the other ends of the female members being mounted on the rear axle 20. A V-shaped yoke has its terminal ends connected to the rear axle, and a pair of tension springs 22 and 23 connect from the return bend of the yoke 21 to the respective female members adjacent to the cross-member 10. A foot operable clutch 24 is vertically slidable on an enlargement 25 formed on the female member and is urged to raised position by a compression spring 26, and the bottom wall 27 has a pin 28 projecting upwardly through a passage 29 in the enlargement and locks in selected passages 30 formed through the underside wall of the male member and is the sole control of all adjustments. Thus, when the foot is applied to the top wall 31 and pressed down, the pin 28 is retracted from a passage 30 in the male member, permitting the seat assembly to be raised or lowered at will.

The rear wheels are rotatably mounted on the rear axle and indicated at 32, and a brake 33 which is provided with a foot operable lever 34 pivoted at 35 to the side member, is provided with stops 36 and 37 to limit movement of the lever to braking and free positions. The caster pivots are indicated at 38 and 39.

The supporting structure for the seat assembly consists of an extensible support such as the X-frames which consist of two members 40 and 41 intermediately pivoted together as indicated at 43, the lower end of the member 40 being pivotally connected to the male member adjacent to the cross member 10 as indicated at 42, and the upper end being slidably connected to the rear portion of the seat frame 44 as indicated by the slot 45 in which the pivot 46 is slidable, the two members 40 forming the legs of a U-shaped frame, being integral with the cross member 47 to provide a rigid structure.

The two members 41 have their lower ends mounted on the axle 20 and their upper ends pivotally connected to the seat frame 44 as indicated at 48. The seat frame is formed into a rectangle, having side members 49 and front and rear cross members 50 and 51, and a seat cushion 52 is supported on this frame.

The handle 53 is substantially U-shaped with the lower ends of the legs thereof being fixedly connected to the side members 49 as indicated at 55, and the back rest 56 is supported by the lower portion of the legs 54.

The arms 57 and 58 are fixedly supported by the seat frame 44 as indicated at 59, and may be either integral with the cross member 60 to form a U-shaped frame, or the cross member 60 may be U-shaped with short legs to telescope into the arms, so as to be removable for insertion in the front ends of the arms to provide a front guard which may be adjusted to two positions, in one of which the legs 61 are inserted in the ends 62 of the arms as far as they will go when the vehicle is used as a stroller, and in the other of which the legs are only partly inserted as shown in Fig. 3 to provide a spaced guard when the vehicle is to be used as a creeper or walker. In either case, the member 60 with its legs 61 inserted in either the back or front ends of the arms provides a rigid arm structure.

A foot rest 63 is hingedly connected to the seat frame as indicated at 64 and is provided with a ratchet 65 for cooperation with a yoke 66 which is also pivotally connected to the seat frame as indicated at 67 to permit adjustment, as also for complete retraction by engagement of the latch 66 in the reverse recess 68 at the lower end, retracting the foot rest to the position indicated by the dotted figure 62′.

This vehicle is adjustable to three positions, but not so limited. As shown, it is adjusted to its most elevated position to provide a high chair. To adjust to stroller position it is merely necessary to press down on the top 31 of the clutch to release the clutch, and then press down on the seat assembly. This causes the chassis to lengthen, with the casters advancing to the dotted position 11′ and with the seat lowering to the dotted position 52′, at which point the clutch will lock the telescopic side members in the instant position if the clutch is freed.

To adjust to the creeper or walker position, the clutch is depressed and the seat assembly forced down to the position 52″ and which coincidently extends the casters still further, to the position 11″, providing ample space between the front end of the seat and the cross member 10 to permit free movement of the child's legs.

Latching means of any suitable type indicated at 69, such as the spring-urged pin 70, is provided for locking the front guard or other apparatus, such as the table 71 in place.

I claim:

1. Elevating and lowering means for a combination convertivle high chair, stroller and toddler comprising an extensible chassis consisting of a pair of telescopic side members and having a fixed cross member at the front end, and having a rear end, casters mounted in said cross member, an axle mouted on said rear end, and wheels on said axle, a seat frame, an extensible support comprising two X-type structures each consisting of two members intermediately pivoted together and having forward and rearward ends with the forward ends of the respective members pivoted respectively to the forward end of the seat frame and forward end of the extensible chassis, and the rearward ends respectively slidably connected to the rearward end of the seat frame and pivotally connected to the rearward end of the extensible chassis, and foot releasable locking means cooperative between the telescopic elements of one side member for locking the side members in three selective extended positions.

2. Elevating and lowering means for a convertible high chair, stroller, and walker, comprising an extensible chassis having a front cross member, a rear axle, telescopic side members each having a forward end and a rearward end with the forward ends connected to the front cross member and the rearward ends connected to the axle, wheels mounted on said axle, casters for said front cross member and vertically pivoted therein, a supporting structure consisting of two assemblies each consisting of two members intermediately pivoted together and having upper and lower ends, a seat frame having the upper ends of said two members respectively pivoted to the forward end and slidably connected to the rearward portion, with the lower ends of the structures respectively having the axle rotatably mounted therein and pivotally connected to the side members adjacent to said front cross member, and releasable locking means cooperative between the telescopic elements of one side member for locking said telescopic side members in various extended positions for adjustment of the seat frame to selectively provide high chair, stroller, and walker elevations for the seat frame.

3. In a convertible high chair, stroller and toddler, elevating and lowering means comprising a chassis having telescopic side members each having a front end and a rear end, a front cross member fixed to the front ends of said telescopic members, and a rear axle pivotally supported in the rear ends of said telescopic members, means for releasably locking the telescopic side members in a plurality of extended positions, and extensible support for each side member and each comprising an X-frame intermediately hinged and having each upper and lower ends with the lower ends respectively hinged to the forward ends of the telescopic members and the rearward ends pivotally supported on the axle, a seat frame having the upper ends of the extensible supports respectively hingedly connected to the forward end and adjustably connected to the rearward portion, and spring means cooperative between the forward and rearward ends of the chassis for normally retracting the telescopic members to elevate the seat frame.

4. In a height adjustable vehicular chair, a seat frame having side members each having a front end and a rear portion and each having an elongated slot formed lengthwise in the rear portion, a chassis consisting of a pair of telescopic side members, a front cross member fixed to the forward ends of said telescopic side members, and an axle pivoted in the rearward ends of said telescopic side members, casters mounted in said front cross member, and wheels mounted on said axle, tension spring means cooperative between the forward end of said chassis and said axle for normally retracting said telescopic members, a pair of X-frames each consisting of two rods intermediately pivoted together and having forward upper and lower ends and rearward upper and lower ends, with the forward upper ends pivoted to the front of said seat frame and the forward lower ends pivoted to the forward end of said chassis, and the rearward upper ends pivotally connected in said slots for pivotal and sliding movement, and the rearward lower ends pivotally supported on said axle, and releasable locking means locking the telescopic side members in selective extended positions for various elevations of the seat frame.

References Cited in the file of this patent

UNITED STATES PATENTS

| 1,366,274 | Orth | Jan. 18, 1921 |
| 2,241,559 | Schulz | May 13, 1941 |
| 2,713,891 | Linquist | July 26, 1955 |
| 2,770,288 | Peyton | Nov. 13, 1956 |

FOREIGN PATENTS

| 897,338 | France | May 22, 1944 |